United States Patent
Han et al.

(10) Patent No.: US 11,264,636 B2
(45) Date of Patent: Mar. 1, 2022

(54) POUCH-SHAPED SECONDARY BATTERY COMPRISING ELECTRODE-TAB-CUTTING DEVICE

(71) Applicant: LG Chem, Ltd., Seoul (KR)

(72) Inventors: Hyun Gyu Han, Daejeon (KR); Dae Sik Choi, Daejeon (KR)

(73) Assignee: LG Energy Solution, Ltd.

( * ) Notice: Subject to any disclaimer, the term of this patent is extended or adjusted under 35 U.S.C. 154(b) by 113 days.

(21) Appl. No.: 16/489,061

(22) PCT Filed: Jul. 4, 2018

(86) PCT No.: PCT/KR2018/007578
§ 371 (c)(1),
(2) Date: Aug. 27, 2019

(87) PCT Pub. No.: WO2019/027147
PCT Pub. Date: Feb. 7, 2019

(65) Prior Publication Data
US 2019/0379084 A1 Dec. 12, 2019

(30) Foreign Application Priority Data
Aug. 1, 2017 (KR) .......................... 10-2017-0097685

(51) Int. Cl.
*H01M 50/578* (2021.01)
*H01M 10/0525* (2010.01)
(Continued)

(52) U.S. Cl.
CPC ....... *H01M 10/0525* (2013.01); *H01M 50/10* (2021.01); *H01M 50/20* (2021.01);
(Continued)

(58) Field of Classification Search
CPC .......... H01M 10/0525; H01M 50/578; H01M 50/531
See application file for complete search history.

(56) References Cited

U.S. PATENT DOCUMENTS 6,524,741 B1 2/2003 Bryan
9,741,995 B2 8/2017 Min et al.
(Continued)

FOREIGN PATENT DOCUMENTS

CN 104603985 A 5/2015
CN 105612082 A 5/2016
(Continued)

OTHER PUBLICATIONS

Supplementary European Search Report for Application No. EP18841899 dated Feb. 24, 2020, 2 pages.
(Continued)

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP (57) ABSTRACT

Disclosed herein is a pouch-shaped secondary battery comprising a pouched-shaped battery case, an electrode assembly having a structure in which a positive electrode, a separator, and a negative electrode are stacked, the electrode assembly having an electrode tab coupled to the positive electrode or the negative electrode and an electrode lead coupled to the electrode tab, the electrode assembly being received in the pouch-shaped battery case, and an electrode-tab-cutting device located in the pouch-shaped battery case, the electrode-tab-cutting device being configured to cut the electrode tab or the electrode lead using an elastic member
(Continued)

that is configured to be actuated when the pressure in the pouch-shaped battery case reaches or exceeds a predetermined limit pressure.

18 Claims, 5 Drawing Sheets

(51) Int. Cl.
  *H01M 50/10* (2021.01)
  *H01M 50/20* (2021.01)
  *H01M 50/531* (2021.01)

(52) U.S. Cl.
  CPC ....... *H01M 50/531* (2021.01); *H01M 50/578* (2021.01); *H01M 2200/20* (2013.01); *H01M 2220/20* (2013.01)

(56) References Cited

U.S. PATENT DOCUMENTS

| | | | |
|---|---|---|---|
| 9,774,026 | B2 | 9/2017 | Shin |
| 2013/0122333 | A1 | 5/2013 | Obika et al. |
| 2015/0072185 | A1 | 3/2015 | Cho et al. |
| 2015/0162593 | A1 | 6/2015 | Lee |
| 2015/0163854 | A1 | 6/2015 | Lee |
| 2016/0141593 | A1 | 5/2016 | Min et al. |
| 2016/0254686 | A1 | 9/2016 | Steil |
| 2017/0047576 | A1 | 2/2017 | Guen |
| 2017/0117515 | A1 | 4/2017 | Ahn et al. |

FOREIGN PATENT DOCUMENTS

| | | | |
|---|---|---|---|
| JP | 2004327047 A | | 11/2004 |
| JP | 2010251017 A | | 11/2010 |
| JP | 2011210390 A | | 10/2011 |
| JP | 2013145717 A | | 7/2013 |
| JP | 2016110940 A | | 6/2016 |
| KR | 20130089327 A | | 8/2013 |
| KR | 101327123 B1 | | 11/2013 |
| KR | 20140053656 | * | 5/2014 |
| KR | 20140053656 A | | 5/2014 |
| KR | 101500229 B1 | | 3/2015 |
| KR | 20150080123 A | | 7/2015 |
| KR | 20150121912 A | | 10/2015 |
| KR | 20160131657 A | | 11/2016 |
| KR | 101704127 B1 | | 2/2017 |
| KR | 20170018667 A | | 2/2017 |
| WO | 2012014730 A1 | | 2/2012 |

OTHER PUBLICATIONS

International Search Report for Application No. PCT/KR2018/007578, dated Oct. 16, 2018, pp. 1-2.
Chinese Search Report for Application No. 201880006052.6, dated Jul. 7, 2021, 2 pages.

* cited by examiner

POUCH-SHAPED SECONDARY BATTERY COMPRISING ELECTRODE-TAB-CUTTING DEVICE

CROSS-REFERENCE TO RELATED APPLICATIONS

This application is a national phase entry under 35 U.S.C. § 371 of International Patent Application No. PCT/KR2018/007578, filed on Jul. 4, 2018, published in Korean, which claims priority from Korean Patent Application No. 10-2017-0097685, filed on Aug. 1, 2017, the disclosures of which are hereby incorporated by reference herein in their entireties.

TECHNICAL FIELD

The present invention relates to a pouch-shaped secondary battery including an electrode-tab-cutting device, and more particularly to a pouch-shaped secondary battery including an electrode-tab-cutting device located in a pouch-shaped battery case, the electrode-tab-cutting device being configured to cut an electrode tab using an elastic member that is triggered when the pressure in the pouch-shaped battery case increases.

BACKGROUND ART

As mobile devices have been continuously developed and the demand for such mobile devices has increased, the demand for secondary batteries as an energy source for such mobile devices has also sharply increased. Accordingly, much research into batteries satisfying various needs has been carried out.

Lithium secondary batteries may be classified into a cylindrical battery, a prismatic battery, and a pouch-shaped battery based on the shape of a battery case. The cylindrical battery is a battery that is configured to have a structure in which an electrode assembly is mounted in a metal can. The prismatic battery is also a battery that is configured to have a structure in which an electrode assembly is mounted in a metal can. The pouch-shaped battery is a battery that is configured to have a structure in which an electrode assembly is mounted in a pouch-shaped battery case made of, for example, an aluminum laminate sheet. Among these battery cells, the pouch-shaped battery cell, which can be stacked with high integration, has high energy density per unit weight, is inexpensive, and can be easily modified, has attracted considerable attention.

One of the principal research projects for secondary batteries is to improve the safety of the secondary batteries. For example, a lithium secondary battery may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperature, or deformation of the secondary battery due to being dropped or having an external impact applied thereto.

Consequently, one of the issues that are to be essentially considered in developing the lithium secondary battery is to guarantee the safety of the lithium secondary battery. As an example of such attempts for guaranteeing the safety of the battery, Japanese Patent Application Publication No. 2011-210390 discloses a battery including a connection-releasing means for releasing an electrical connection between an electrode terminal formed at a battery case and a lead for connecting the terminal and an electric storage device to each other and a push means for pushing a cutting means toward the lead when the temperature in a hollow part in which the connection-releasing means is received exceeds a predetermined temperature.

However, the above-described technology cannot be applied to a conventional battery having a general electrode terminal, since the hollow part, in which the connection-releasing means is received, is formed in the electrode terminal formed at the battery case.

As another example of the conventional art, Korean Patent Application Publication No. 2013-0089327 discloses a battery including a support member having a first thermal shrinkage member and a second thermal shrinkage member mounted thereto, wherein the first thermal shrinkage member and the second thermal shrinkage member have opposite thermal shrinkage directions such that the first thermal shrinkage member and the second thermal shrinkage member move in opposite directions in order to cut an electrode tab.

However, the above-described technology has a problem in that the overall size of the secondary battery is increased, since a cutting device is mounted to the outside of a battery case.

As a further example of the conventional art, Japanese Patent Application Publication No. 2013-145717 discloses an electric storage device configured such that a cutting means for cutting an electrode connection portion is disposed in a battery case. However, the cutting means is made of a member that is thermally deformable, and therefore the cutting means is useful only in the case of a temperature change. Consequently, it is difficult to apply the cutting means to technology for cutting an electrode tab due to an increase in the volume of the pouch-shaped secondary battery.

Therefore, there is a strong necessity for technology that is capable of preventing the explosion of a pouch-shaped secondary battery due to the generation of gas in the secondary battery, is capable of being applied to a conventional battery cell, and is capable of preventing an increase in the overall volume of the secondary battery and thus preventing a reduction in the capacity of the secondary battery.

DISCLOSURE

Technical Problem

The present invention has been made in view of the above problems, and it is an object of the present invention to provide a secondary battery including an electrode-tab-cutting device located in a pouch-shaped battery case, the electrode-tab-cutting device being configured to cut an electrode tab of an electrode assembly using an elastic member that is triggered when the pressure in the pouch-shaped battery case increases.

In addition, a trigger, by which the elastic member is operated, is linked to the battery case. Consequently, the present invention is applicable to a pouch-shaped secondary battery, the external shape of which is deformed by gas generated in a pouch-shaped battery case.

Technical Solution

In accordance with an aspect of the present invention, the above and other objects can be accomplished by the provision of a pouch-shaped secondary battery comprising a pouched-shaped battery case, an electrode assembly having a structure in which a positive electrode, a separator, and a negative electrode are stacked, the electrode assembly having an electrode tab coupled to the positive electrode or the negative electrode and an electrode lead coupled to the electrode tab, the electrode assembly being is received in the pouch-shaped battery case, and an electrode-tab-cutting device located in the pouch-shaped battery case, the electrode-tab-cutting device being configured to cut the electrode tab or the electrode lead using an elastic member that is configured to be actuated when the pressure in the pouch-shaped battery case reaches or exceeds a predetermined limit pressure.

Since the electrode-tab-cutting device according to the present invention is located in the dead space defined in the pouch-shaped battery case, in which the connection between the electrode tab and the electrode lead is located, it is not necessary to reduce the size of the electrode assembly. Furthermore, the electrode-tab-cutting device does not increase the overall size of the secondary battery even in the case in which the electrode-tab-cutting device is received.

In addition, since the principle of triggering the elastic member when the pressure in the pouch-shaped battery case increases is used, the elastic member may be rapidly and accurately operated to cut the electrode tab when the battery case swells.

In addition, since the electrode-tab-cutting device is applicable to an electrode assembly having a general structure, the range of objects to which the electrode-tab-cutting device is applicable is not limited. Consequently, no additional process or additional member is required in order to apply the electrode-tab-cutting device.

In a concrete example, the electrode-tab-cutting device may include a trigger coupled to the pouch-shaped battery case, a thread-shaped cutting member disposed such that the electrode tab or the electrode lead extends therethrough, the elastic member being coupled to one end of the cutting member and maintained in an expanded condition by engagement with the trigger, and a tubular case having an opening through which the cutting member is configured to move, the opening being formed in a first surface of the tubular case that is adjacent to the electrode tab or the electrode lead, the elastic member being disposed in the tubular case and fixed to a second surface of the tubular case opposite the first surface.

Since the trigger, which is configured to operate the elastic member, is linked to the pouch-shaped battery case, as described above, the trigger may move to operate the elastic member in response to deformation of the shape of the pouch-shaped battery case due to swelling thereof.

In addition, the elastic member is connected to the cutting member, which is a member located such that the electrode tab extends therethrough and which is configured to have, for example, a closed-curve structure. In response to the elastic movement of the elastic member, the cutting member moves into the case in order to cut the electrode tab or the electrode lead.

In consideration of the structure in which the electrode tab is located in the cutting member, however, the cutting member may be formed in the shape of a thin thread, and may be made of a material that exhibits strong cutting force. In addition, the cutting member may be made of a material that exhibits non-elasticity, excellent insulativity, and high tensile strength in order to rapidly cut the electrode tab.

The electrode tab is not necessarily the only element that is cut by the cutting member. An easily cuttable region of the electrode tab or the electrode lead may be selected. Alternatively, an appropriate region of the electrode tab or the electrode lead may be selected depending on the position of the electrode-tab-cutting device.

In general, a plurality of electrode tabs protrudes from the electrode assembly so as to be connected to the electrode lead. At this time, an easily cuttable region of the electrode tabs or the electrode lead may be selected.

The elastic member is mounted in the case, and the opening, which serves as a path through which the cutting member, which is connected to the elastic member, moves, is formed in the case. Consequently, the elastic member may be configured to shrink from the expanded condition to a contracted condition due to an elastic force thereof when the trigger is disengaged from the elastic member due to expansion of the pouch-shaped battery case.

Specifically, the trigger may move upwards and downwards due to the deformation of the pouch-shaped battery case in the state in which the longitudinal direction of the trigger is parallel to the stacked direction of the electrode assembly. In the initial state, the trigger is located on the case of the electrode-tab-cutting device in a tight contact state in order to fix the elastic member in the state in which the elastic member is stretched. When the pouch-shaped battery case swells, the trigger moves upwards so as to be spaced apart from the elastic member.

Consequently, the elastic member is restored to the original state thereof due to the elastic force thereof, and the cutting member is configured to move into the tubular case when the elastic member shrinks to the contracted condition, with the result that the cutting member, which is located such that the electrode tab extends therethrough, moves into the battery case in the direction perpendicular to the direction in which the electrode tab protrudes. At this time, the electrode tab may be cut by the cutting member.

The material for the elastic member is not particularly restricted, as long as the elastic member can stretch and shrink in the state of being connected to the cutting member. For example, the elastic member may be a spring or a piece of rubber.

In a concrete example, the electrode-tab-cutting device may further include a pressure sensor member configured to shrink when a volume of the pouch-shaped battery case reaches or exceeds a predetermined limit volume. When the pressure sensor member shrinks, the trigger may move into the pressure sensor member and may disengage from the elastic member, such that the elastic member may shrink from the expanded condition to a contracted condition.

For example, the case, in which the elastic member is disposed, may have a cuboidal or cylindrical shape. In the case in which the case has a cuboidal shape, the pressure sensor member may be attached to at least one of the four surfaces of the case parallel to the major-axis direction. In the case in which the case has a cylindrical shape, one or more sensor members may be attached to the side surface of the case parallel to the major-axis direction at predetermined intervals.

In the case in which the pressure in the pouch-shaped battery case increases, the pressure sensor member, the pressure in which is relatively low, shrinks, and the trigger, which is connected to the pressure sensor member, moves into the pressure sensor member. The fixed state of the elastic member is released due to the movement of the trigger, and the elastic member, the fixed state of which has been released, shrinks, whereby the electrode tab or the electrode lead may be cut.

Consequently, the pressure in the pressure sensor member must be maintained less than the pressure in the pouch-shaped battery case. The sheathing member of the pressure sensor member may be made of a shrinkable material.

In consideration of the fact that the pressure limit of the pouch-shaped battery case, at which the pouch-shaped battery case explodes due to swelling thereof, is generally about 3 bar, the range of the pressure at which the pressure sensor member shrinks may range from 2 bar to less than 3 bar.

The electrode-tab-cutting device may be mounted in the pouch-shaped battery case such that the side surface of the tubular case in a major-axis direction of the tubular case confronts the side surface of the electrode assembly from which the electrode tab protrudes. Specifically, the electrode-tab-cutting device may be located at the left side or the right side of the electrode tab-lead connection of the electrode assembly in the state of being adjacent to the electrode tab-lead connection. Alternatively, the electrode-tab-cutting device may be located at each of the left side and the right side of the electrode tab-lead connection. In the case in which a positive electrode tab and a negative electrode tab protrude in opposite directions, the electrode-tab-cutting device may be located at one side or each side of each of the positive electrode tab and the negative electrode tab.

Since the space defined at the left side or the right side of the electrode tab-lead connection is considered to be the dead space defined in the pouch-shaped battery case, it is not necessary to secure additional space even in the case in which the electrode-tab-cutting device is received.

The electrode-tab-cutting device is located in the electrode assembly reception unit so as to be adjacent to a sealed portion of the battery case. The electrode-tab-cutting device needs to be fixed when the elastic member performs elastic movement. The second surface of the tubular case, which constitutes the electrode-tab-cutting device, i.e. the surface of the case that is opposite the surface of the case adjacent to the electrode terminal, may be fixed to the sealed portion of the pouch-shaped battery case.

In a concrete example, the elastic force of the elastic member may range from 30 kgf to 60 kgf, preferably from 35 kgf to 55 kgf.

In the case in which the elastic force of the elastic member is less than 30 kgf, it is difficult to rapidly and accurately the electrode tab, which is undesirable. In the case in which the elastic force of the elastic member is greater than 60 kgf, the size of the elastic member may be unnecessarily increased, and it may be difficult to fix the elastic member using the trigger, which is also undesirable.

The length of the trigger may be 50% to 100%, preferably 70% to 100%, of the vertical sectional height of the case.

In the case in which the length of the trigger is less than 50% of the vertical sectional height of the case, the electrode-tab-cutting device may be operated to cut the electrode tab due to small external impacts, rather than abnormal operation of the secondary battery, which is undesirable. In the case in which the length of the trigger is greater than 100% of the vertical sectional height of the case, the trigger may extend through the case, which is also undesirable.

In a concrete example, two or more triggers may be provided in order to more stably fix the elastic member in consideration of the fact that it is necessary to operate the electrode-tab-cutting device only in the situation in which the electrode-tab-cutting device is substantially required to be operated. The two or more triggers may be spaced apart from each other. The distance between the triggers and the locations of the triggers are not particularly restricted. The distance between the triggers, the locations of the triggers, and the number of triggers may be set in consideration of the position at which the electrode tab is formed based on the side surface of the electrode assembly from which the electrode tab protrudes and the fact that the battery case maximally swells at the central part thereof.

Meanwhile, two or more electrode-tab-cutting devices may be provided in order to prevent the occurrence of a problem in which the electrode tab is not completely cut due to malfunction of the electrode-tab-cutting device, whereby the flow of current is not blocked.

Also, in the case in which a positive electrode tab and a negative electrode tab protrude in opposite directions, the electrode-tab-cutting device may be located at one side or each side of each of the positive electrode tab and the negative electrode tab.

In accordance with another aspect of the present invention, there is provided a battery pack including the pouch-shaped secondary battery.

Specifically, the battery pack may be used as a power source for a device requiring the ability to withstand high temperatures, a long cycle, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 1:
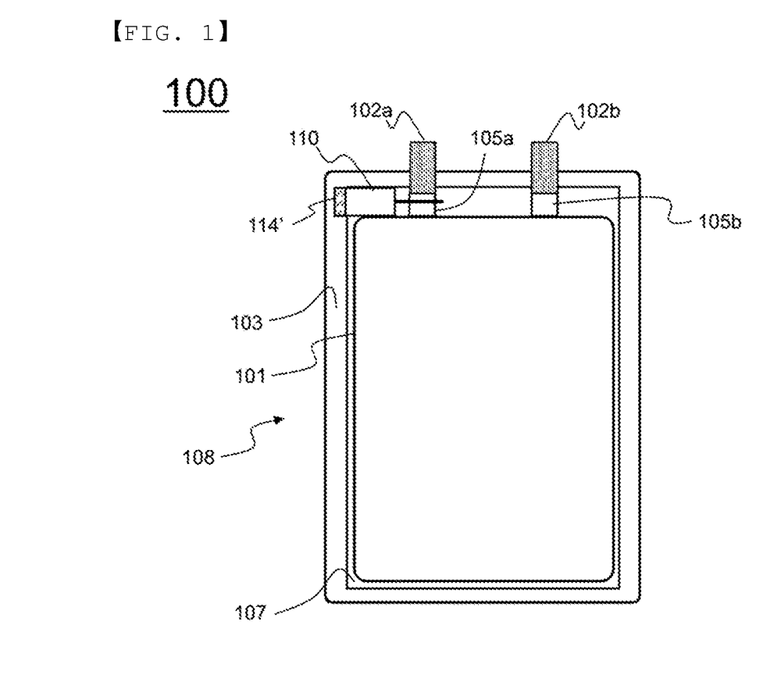
FIG. 1 is a plan view showing a pouch-shaped secondary battery including an electrode-tab-cutting device according to an embodiment of the present invention.
Figure 2:
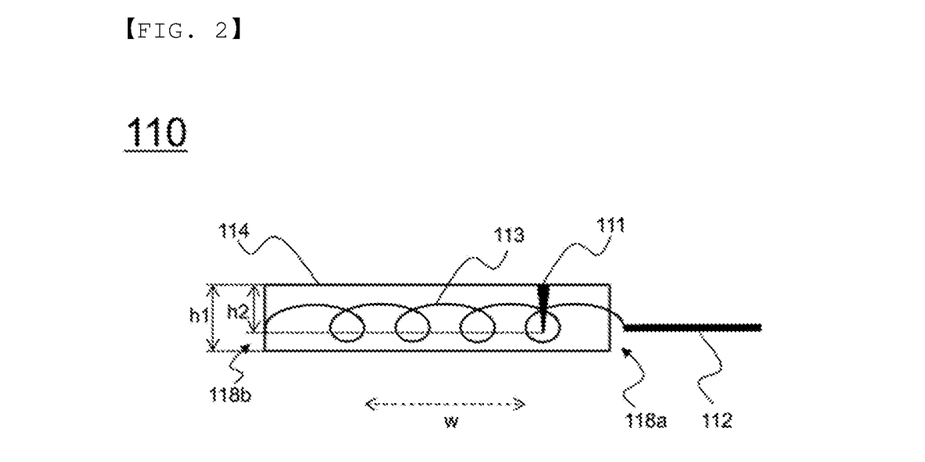
FIG. 2 is a front view showing the electrode-tab-cutting device of FIG. 1.

FIG. 1 is a plan view showing a pouch-shaped secondary battery including an electrode-tab-cutting device according to an embodiment of the present invention, and FIG. 2 is an enlarged front view showing the electrode-tab-cutting device of FIG. 1.

Referring to FIGS. 1 and 2, a pouch-shaped secondary battery 100, an outer edge 103 of which is sealed, includes an upper case (not shown) and a lower case 108. The pouch-shaped secondary battery 100 is provided in the middle part thereof with an electrode assembly reception unit 107, which is configured to have a concave structure in which an electrode assembly 101 is received. The electrode assembly 101 is configured to have a structure in which positive electrode tabs 105a and negative electrode tabs 105b protrude in the same direction. A positive electrode lead 102a is connected to the outer ends of the positive electrode tabs 105a, and a negative electrode lead 102b is connected to the outer ends of the negative electrode tabs 105b. The positive electrode lead 102a and the negative electrode lead 102b extend out of the battery case.

The positive electrode tabs, the negative electrode tabs, and the electrode leads may protrude in the same direction or in different directions.

Since the electrode tabs 105a and 105b and the electrode leads are bent at the connections between the electrode tabs and the electrode leads in the direction in which the electrode tabs protrude, the side surface of the electrode assembly and the side surface of the lower case 108, which is opposite the side surface of the electrode assembly, are located so as to be spaced apart from each other.

An electrode-tab-cutting device 110 is disposed in the portion of the space in which the electrode tabs and the electrode leads are not located.

The electrode-tab-cutting device 110 includes a trigger 111 linked to a pouch-shaped battery case, a thread-shaped cutting member 112 disposed such that the electrode tabs 105a or 105b extend therethrough, an elastic member 113 connected to one end of the cutting member 112 while being fixed by the trigger 111, and a case 114 having an opening (not shown), through which the cutting member 112 is movable, formed in one surface thereof, which is adjacent to the electrode tabs 105a, the elastic member 113 being disposed in the case in the state in which the elastic member 113 is fixed to the other surface of the case.

One end of the elastic member 113 is connected to one surface of the case 114 in the state in which the elastic member is stretched, and the other end of the elastic member 113 is connected to the cutting member 112. The trigger 111, which is linked to a battery case 130, is located at the upper surface of the case 114. The trigger 111 is located so as to extend through the case 114, and fixes the elastic member 113 in the state in which the elastic member is stretched. The length h2 of the trigger is 50% to 100% of the vertical sectional height h1 of the case 114.

The case 114 is mounted in the battery case such that the side surface of the case 114 in the major-axis direction w is opposite the side surface of the electrode assembly 101 in the direction in which the electrode tabs 105a protrude. A portion 114' of the case 114 at the surface 118b of the case 114, which is opposite the surface 118a of the case 114, in which the opening, which serves as a path through which the cutting member 112 moves, is formed, is located on a sealed portion of the outer edge 103 of the battery case, and is fixed by thermal fusion when the battery case in sealed.

Figure 3:
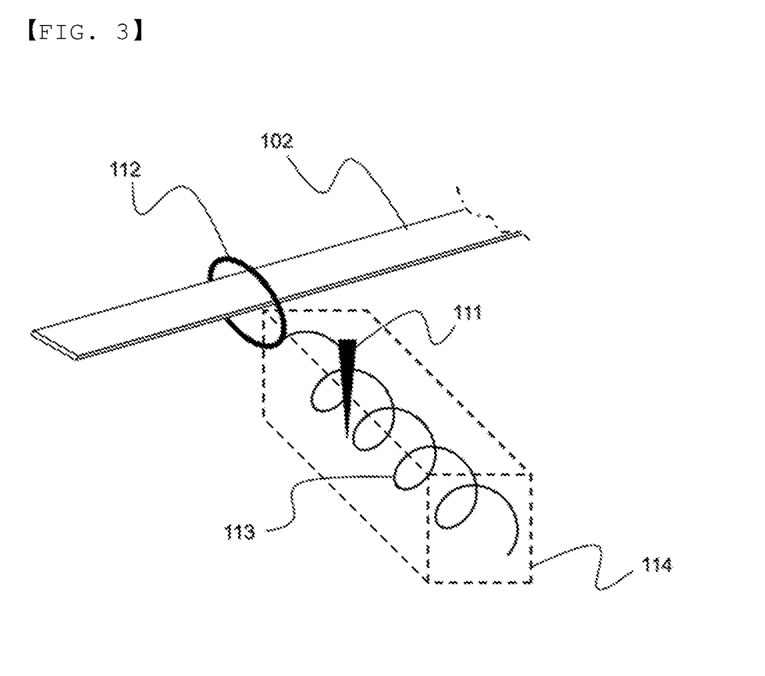
FIG. 3 is a perspective view showing the state in which the electrode-tab-cutting device of FIG. 2 is applied to an electrode tab.
Figure 4:
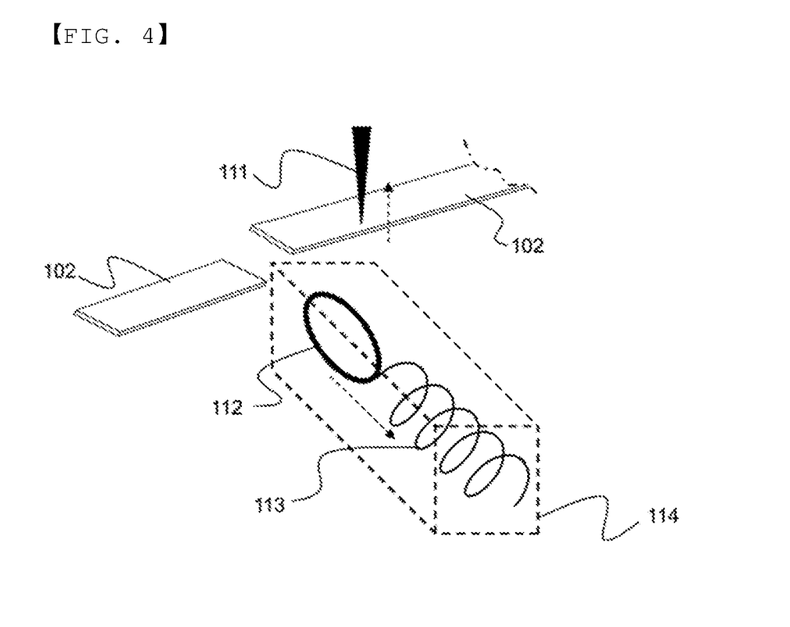
FIG. 4 is a perspective view showing the state in which the electrode tab is cut by the electrode-tab-cutting device of FIG. 3.

FIGS. 3 and 4 are perspective views schematically showing the positive electrode tabs 105a before and after being cut using the electrode-tab-cutting device 110 of FIG. 2, respectively.

Referring to FIGS. 3 and 4, the cutting member 112 is located such that the positive electrode tabs 105a extend through the cutting member in the state in which the cutting member is connected to the elastic member 113. The elastic member 113 is fixed by the trigger 111 in the state of being stretched.

In the case in which the trigger 111 moves upwards due to the swelling of the battery case 130, the elastic member 113, which is fixed in the state of being stretched, shrinks in the direction opposite the electrode tab, with the result that the cutting member 112, which is connected to the elastic member 113, moves in the direction in which the elastic member 113 shrinks. At this time, the electrode tabs 102 are cut. As a result, the movement of current is blocked, whereby it is possible to prevent the explosion or combustion of the battery due to the malfunction of the battery. Throughout the specification, the positive electrode tabs 105a are not necessarily the only element that is cut by the cutting member 112. An easily cuttable region of the positive electrode tabs 105a, the negative electrode tabs 105b, or one of the electrode leads 102a and 102b may be selected. Alternatively, an appropriate region of the positive electrode tabs, the negative electrode tabs, or one of the electrode leads may be selected depending on the position of the electrode-tab-cutting device 110.

In general, pluralities of electrode tabs 105a and 105b protrude from the electrode assembly 101 so as to be connected to corresponding electrode leads. At this time, an easily cuttable region of the electrode tabs 105a or 105b or the electrode leads 102a or 102b may be selected.

Figure 5:
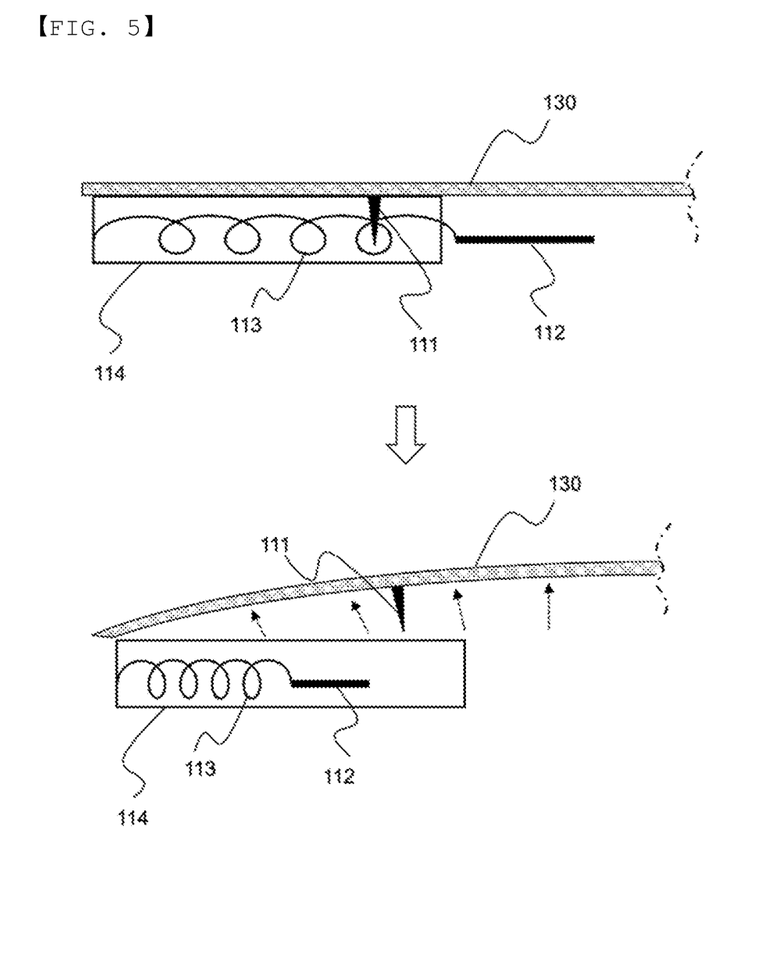
FIG. 5 is a front view showing the process in which the electrode-tab-cutting device is operated by the expansion of a pouch-shaped battery case.

FIG. 5 is a front view schematically showing the process in which the electrode-tab-cutting device, which includes the trigger linked to the pouch-shaped battery case 130, is operated.

Referring to FIG. 5, the battery case 130 is located so as to be adjacent to the upper surface of the case 114 of the electrode-tab-cutting device 110, and the trigger 111 is connected to the battery case 130.

In the case in which the battery case 130 swells due to abnormal operation of the battery cell, the trigger 111 moves in the direction in which the battery case 130 swells, whereby the fixed state of the elastic member 113 is released. As a result, the elastic member 113 shrinks, and the cutting member 112 moves in the direction in which the elastic member 113 shrinks, whereby the electrode tabs are cut.

Figure 6:
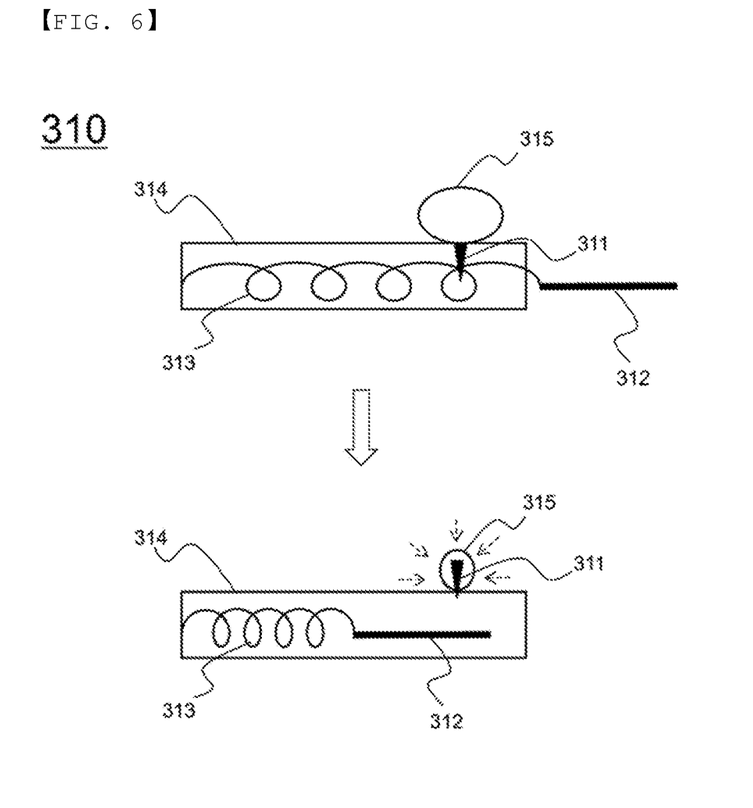
FIG. 6 is a front view showing the process in which an electrode-tab-cutting device according to another embodiment of the present invention is operated.

FIG. 6 is a front view schematically showing the process in which an electrode-tab-cutting device according to another embodiment of the present invention is operated.

Referring to FIG. 6, an electrode-tab-cutting device 310 further includes a pressure sensor member 315, which is configured to shrink due to an increase in the volume of the pouch-shaped battery case, unlike the electrode-tab-cutting device 110.

That is, the electrode-tab-cutting device 310 is configured such that a trigger 311, which fixes an elastic member 313 in the state in which the elastic member is stretched, is connected to the pressure sensor member 315 and such that the pressure sensor member 315 is located at the outer surface of a case 314. FIG. 6 shows a single pressure sensor member. Alternatively, two or more pressure sensor members may be located at the outer surface of the case. In the case in which the pressure in the pouch-shaped battery case increases, the pressure sensor member 315, the pressure in which is relatively low, shrinks, and the trigger 311 moves into the pressure sensor member 315. As a result, the fixed state of the elastic member 313, which is fixed by the trigger 311 in the state in which the elastic member is stretched, is released, whereby the elastic member is restored due to the elastic force thereof. Consequently, a cutting member 312 moves along with the elastic member, whereby electrode tabs or an electrode lead is cut.

Each of the case 114 of the electrode-tab-cutting device 110 and the case 314 of the electrode-tab-cutting device 310 may have a cuboidal or cylindrical shape. Two or more pressure sensor members 315 may be located at the side surface of the case 314 in the major-axis direction.

Figure 7:
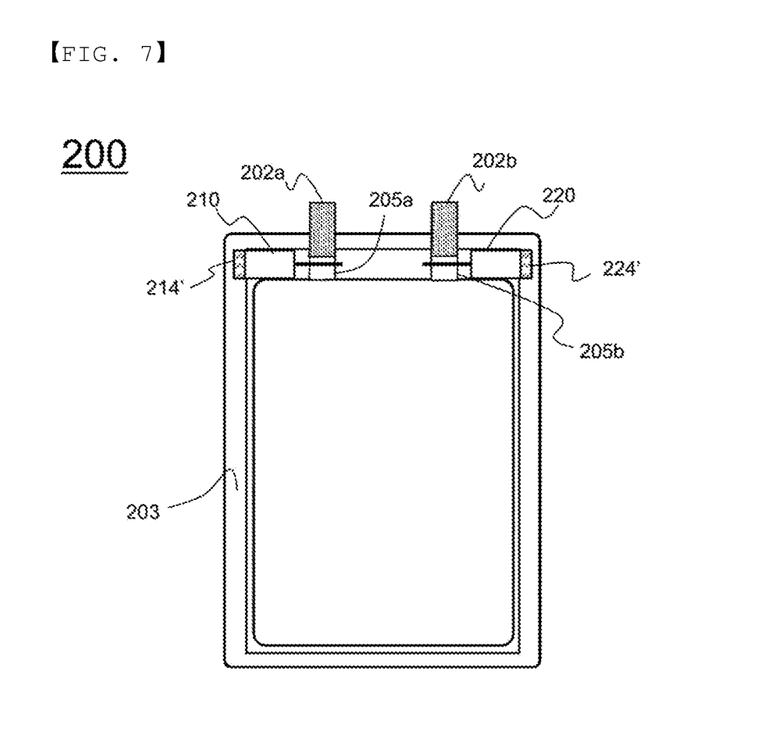
FIG. 7 is a plan view showing a pouch-shaped secondary battery including electrode-tab-cutting devices according to another embodiment of the present invention.

FIG. 7 is a plan view schematically showing a pouch-shaped secondary battery according to another embodiment of the present invention.

Referring to FIG. 7, a pouch-shaped secondary battery 200 according to another embodiment of the present invention is configured such that an electrode-tab-cutting device 210 is located at the left side of the connection between positive electrode tabs 205a and a positive electrode lead 202a, such that another electrode-tab-cutting device 220 is located at the right side of the connection between negative electrode tabs 205b and a negative electrode lead 202b, and such that the left end 214' of the electrode-tab-cutting device 210 and the right end 224' of the electrode-tab-cutting device 220 overlap a sealed portion of the outer edge 203 of a battery case.

The structure of the other elements of each of the electrode-tab-cutting devices 210 and 220 is similar to that of the other elements of the electrode-tab-cutting device 110, and therefore a detailed description thereof will be omitted. As is apparent from the above description, the pouch-shaped secondary battery according to the present invention is configured such that the electrode-tab-cutting device is received in the reception unit of the battery case. As a result, it is possible to utilize the dead space in the secondary battery without increasing the volume of the secondary battery. In addition, it is possible to rapidly cut the electrode tabs when the volume of the battery case increases, whereby it is possible to prevent explosion of the secondary battery due to overheating of the secondary battery. Consequently, it is possible to provide a secondary battery having improved safety.

Those skilled in the art to which the present invention pertains will appreciate that various applications and modifications are possible based on the above description, without departing from the scope of the present invention.

DESCRIPTION OF REFERENCE SYMBOLS

100: Pouch-shaped secondary battery according to an embodiment
101: Electrode assembly
102: Electrode tab
102a, 202a: Positive electrode leads
102b, 202b: Negative electrode leads
103, 203: Outer edges
105a, 205a: Positive electrode tabs
105b, 205b: Negative electrode tabs
107: Reception unit
108: Lower case
110, 210, 220: Electrode-tab-cutting devices
111, 311: Triggers
112, 312: Cutting members
113, 313: Elastic members
114, 314: Cases
118a: Surface having opening formed therein
118b: Surface opposite surface having opening formed therein
130: Battery case
200: Pouch-shaped secondary battery according to another embodiment
315: Pressure sensor member
h1: Vertical sectional height of case
h2: Length of trigger
w: Major-axis direction of case

INDUSTRIAL APPLICABILITY

A pouch-shaped secondary battery according to the present invention is configured such that an electrode-tab-cutting device, which cuts electrode tabs of an electrode assembly using an elastic member that is triggered when the pressure in a battery cell increases, is located in a pouch-shaped battery case. Consequently, it is possible to rapidly and accurately cut the electrode tabs when the volume of the battery case increases without increasing the overall size of the secondary battery.

In addition, the trigger, by which the elastic member is operated, is linked to the battery case. Consequently, it is possible to prevent explosion of the secondary battery in the case in which the electrode-tab-cutting device is applied to the pouch-shaped battery case, which easily swells.

The invention claimed is:

1. A pouch-shaped secondary battery, comprising:
a pouched-shaped battery case;
an electrode assembly having a structure in which a positive electrode, a separator, and a negative electrode are stacked, the electrode assembly having an electrode tab coupled to the positive electrode or the negative electrode and an electrode lead coupled to the electrode tab, the electrode assembly being received in the pouch-shaped battery case;
an electrode-tab-cutting device located in the pouch-shaped battery case, the electrode-tab-cutting device being configured to cut the electrode tab or the electrode lead using an elastic member that is configured to be actuated when a pressure in the pouch-shaped battery case reaches or exceeds a predetermined limit pressure;
a trigger coupled to the pouch-shaped battery case;
a thread-shaped cutting member disposed such that the electrode tab or the electrode lead extends therethrough;
the elastic member being coupled to one end of the cutting member and maintained in an expanded condition by engagement with the trigger; and
a tubular case having an opening through which the cutting member is configured to move, the opening being formed in a first surface of the tubular case that is adjacent to the electrode tab or the electrode lead, the elastic member being disposed in the tubular case and fixed to a second surface of the tubular case opposite the first surface.

2. The pouch-shaped secondary battery according to claim 1, wherein the elastic member is configured to shrink from the expanded condition to a contracted condition due to an elastic force thereof when the trigger is disengaged from the elastic member due to expansion of the pouch-shaped battery case.

3. The pouch-shaped secondary battery according to claim 2, wherein the cutting member is configured to move into the tubular case when the elastic member shrinks to the contracted condition, such that the movement of the cutting member cuts the electrode tab or the electrode lead.

4. The pouch-shaped secondary battery according to claim 1, wherein the elastic member is a spring or a piece of rubber.

5. The pouch-shaped secondary battery according to claim 1, wherein the electrode-tab-cutting device further comprises a pressure sensor member configured to shrink when a volume of the pouch-shaped battery case reaches or exceeds a predetermined limit volume, and
when the pressure sensor member shrinks, the trigger moves into the pressure sensor member and disengages from the elastic member, such that the elastic member shrinks from the expanded condition to a contracted condition.

6. The pouch-shaped secondary battery according to claim 1, wherein the electrode-tab-cutting device is mounted in the pouch-shaped battery case such that a side surface of the tubular case in a major-axis direction of the tubular case confronts a side surface of the electrode assembly from which the electrode tab protrudes.

7. The pouch-shaped secondary battery according to claim 1, wherein the second surface of the tubular case is fixed to a sealed portion of the pouch-shaped battery case.

8. The pouch-shaped secondary battery according to claim 1, wherein the trigger is a first trigger, the electrode-tab-cutting device further comprising a second trigger located in the tubular case and spaced apart from the first trigger.

9. The pouch-shaped secondary battery according to claim 1, wherein the electrode-tab-cutting device is a first electrode-tab-cutting device, the electrode tab is a first electrode tab, and the electrode lead is a first electrode lead, the pouch-shaped secondary battery further comprising a second electrode-tab-cutting device configured to cut a second electrode tab or a second electrode lead.

10. A battery pack comprising a pouch-shaped secondary battery according to claim 1.

11. A method of cutting an electrode tab of a pouch-shaped secondary battery, the method comprising:
providing a pouched-shaped battery case including an electrode assembly having a structure in which a positive electrode, a separator, and a negative electrode are stacked, the electrode assembly having an electrode tab coupled to the positive electrode or the negative electrode and an electrode lead coupled to the electrode tab, the electrode assembly being received in the pouch-shaped battery case, the pouch-shaped battery case further including an electrode-tab-cutting device located in the pouch-shaped battery case and having an elastic member disposed in an initial expanded condition, the electrode-tab-cutting device further including a trigger coupled to the pouch-shaped battery case, a thread-shaped cutting member coupled to the elastic member and disposed such that the electrode tab or the electrode lead extends therethrough, and a tubular case through which the cutting member moves;
increasing at least one of a volume or a pressure inside the pouch-shaped battery case;
expanding the pouched-shaped battery case due to an increase in the volume inside the pouch-shaped battery case;
moving the trigger relative to the elastic member, thereby disengaging the trigger from the elastic member, the moving of the trigger caused by expanding of the pouch-shaped battery case;
shrinking the elastic member from the initial expanded condition to a contracted condition, the shrinking of the elastic member being due to an elastic force thereof when the trigger is disengaged from the elastic member, the shrinking of the elastic member including moving the elastic member within the tubular case and causing the electrode-tab-cutting device to cut the electrode tab or the electrode lead.

12. The method according to claim 11, wherein the tubular case has an opening formed in a first surface thereof that is adjacent to the electrode tab or the electrode lead, the method further comprising:
moving the cutting member through the opening due to the trigger being disengaged from the elastic member, the elastic member being disposed in the tubular case and fixed to a second surface of the tubular case opposite the first surface.

13. The method according to claim 12, wherein the cutting member moves through the opening into the tubular case when the elastic member shrinks from the initial expanded condition to the contracted condition, such that the moving of the cutting member cuts the electrode tab or the electrode lead.

14. The method according to claim 11, wherein the electrode-tab-cutting device further comprises a pressure sensor member, the method further comprising:
shrinking the pressure sensor member due to the increasing of the pressure inside the pouch-shaped battery case, and
moving the trigger into the pressure sensor member, the moving of the trigger into the pressure sensor member caused by the shrinking of the pressure sensor member.

15. The method according to claim 14, wherein the pressure-sensing member moves from a swollen state to a compressed state due to the increasing of the pressure inside the pouch-shaped battery case, and a pressure in the pressure-sensing member is lower than the pressure in the pouch-shaped battery case when the pressure-sensing member is in the swollen state.

16. The method according to claim 11, wherein the electrode-tab-cutting device is mounted in the pouch-shaped battery case such that a side surface of the tubular case in a major-axis direction of the tubular case confronts a side surface of the electrode assembly from which the electrode tab protrudes.

17. The method according to claim 11, wherein the trigger is a first trigger, the electrode-tab-cutting device further including a second trigger located in the tubular case and spaced apart from the first trigger, the method further comprising:
moving the second trigger relative to the elastic member, thereby disengaging the second trigger from the elastic member, the moving of the second trigger caused by the expanding of the pouch-shaped battery case.

18. The method according to claim 11, wherein the electrode-tab-cutting device is a first electrode-tab-cutting device, the elastic member is a first elastic member, the electrode tab is a first electrode tab, and the electrode lead is a first electrode lead, the pouch-shaped secondary battery further comprising a second electrode-tab-cutting device having a second elastic member, the method further comprising:

moving the second elastic member from an initial expanded condition to a contracted condition, the moving of the second elastic member causing the second electrode-tab-cutting device to cut a second electrode tab or a second electrode lead.

\* \* \* \* \*